United States Patent
Kwak

(10) Patent No.: US 9,176,724 B2
(45) Date of Patent: Nov. 3, 2015

(54) FIRMWARE UPDATE METHOD AND APPARATUS OF SET-TOP BOX FOR DIGITAL BROADCAST SYSTEM

(75) Inventor: Jae Hwan Kwak, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 799 days.

(21) Appl. No.: 12/952,899

(22) Filed: Nov. 23, 2010

(65) Prior Publication Data

US 2011/0126182 A1    May 26, 2011

(30) Foreign Application Priority Data

Nov. 26, 2009  (KR) .................. 10-2009-0115253

(51) Int. Cl.
| | |
|---|---|
| G06F 9/44 | (2006.01) |
| G06F 9/445 | (2006.01) |
| G06F 9/00 | (2006.01) |
| H04N 21/458 | (2011.01) |
| H04N 21/443 | (2011.01) |

(52) U.S. Cl.
CPC .............. G06F 8/65 (2013.01); H04N 21/4432 (2013.01); H04N 21/4586 (2013.01)

(58) Field of Classification Search
CPC .. H04N 21/4432; H04N 21/4586; G06F 8/61; G06F 8/65
See application file for complete search history.

(56) References Cited

U.S. PATENT DOCUMENTS

| | | | |
|---|---|---|---|
| 6,895,463 B2 * | 5/2005 | Oga et al. ................... 711/103 |
| 7,149,889 B2 * | 12/2006 | Stalker et al. ................... 713/2 |
| 7,178,141 B2 * | 2/2007 | Piazza ........................... 717/168 |
| 7,657,886 B1 * | 2/2010 | Chen et al. ................... 717/170 |
| 7,681,028 B2 * | 3/2010 | Stalker et al. ................... 713/2 |
| 7,774,820 B2 * | 8/2010 | Prus et al. ..................... 725/132 |
| 8,438,556 B2 * | 5/2013 | Abe ............................... 717/170 |
| 8,522,232 B1 * | 8/2013 | Carter et al. ................... 717/173 |
| 8,544,053 B2 * | 9/2013 | Taskiran-Cyr ............... 725/132 |
| 2002/0128029 A1 | 9/2002 | Nishikawa et al. |
| 2002/0170050 A1 * | 11/2002 | Fiorella et al. ................ 717/168 |
| 2007/0143812 A1 * | 6/2007 | Choi ............................. 725/132 |
| 2007/0169118 A1 * | 7/2007 | Choi ............................. 717/174 |
| 2008/0216066 A1 * | 9/2008 | Oh ................................ 717/173 |
| 2009/0044184 A1 * | 2/2009 | Panagas et al. ............... 717/173 |
| 2009/0094597 A1 * | 4/2009 | Moskalik et al. ............. 717/174 |
| 2009/0300598 A1 * | 12/2009 | Choi ............................. 717/173 |
| 2010/0058312 A1 * | 3/2010 | Morohoshi ................... 717/168 |
| 2010/0318983 A1 * | 12/2010 | Hung et al. ................... 717/168 |

OTHER PUBLICATIONS

Cable Televison Lab., Inc., OpenCable Specifications Common Download 2.0, 2010, 50 pages.*
Chakravorty et al., Architecture and implementation of a remote management framework for dynamically reconfigurable devices, 2002, 6 pages.*

* cited by examiner

*Primary Examiner* — Thuy Dao
(74) *Attorney, Agent, or Firm* — The Farrell Law Firm, P.C.

(57) ABSTRACT

A firmware update method and apparatus of a set-top box for a digital broadcast system is provided. A firmware update method of a set-top box for a digital broadcast system includes determining whether a newly received Code Version Table (CVT) following a public CVT which has been previously received and stored is the public CVT or a filtering CVT; and updating, when the newly received CVG is the filtering CVT, the firmware of the set-top box with a filtering firmware indicated by the filtering CVT.

18 Claims, 7 Drawing Sheets

FIRMWARE UPDATE METHOD AND APPARATUS OF SET-TOP BOX FOR DIGITAL BROADCAST SYSTEM

PRIORITY

This application claims priority under 35 U.S.C. §119(a) to a Korean Patent Application filed in the Korean Intellectual Property Office on Nov. 26, 2009 and assigned Serial No. 2009-0115253, the entire disclosure of which is incorporated herein by reference.

BACKGROUND OF THE INVENTION

1. Field of the Invention

The present invention generally relates to digital broadcast systems and, in particular, to a firmware update method and apparatus of a set-top box in a digital broadcast system.

2. Description of the Related Art

Digital broadcast systems are classified into digital terrestrial broadcast systems, digital satellite broadcast systems, and cable digital broadcast systems depending on the transmission medium. One feature of these mediums is that program data is transmitted on each channel using high compression based on the Moving Picture Experts Group (MPEG) encoding standard. Programs of a plurality of channels are multiplexed in a highly efficient manner based on the high-efficiency digital modulation scheme per channel. For this reason, digital broadcast systems can broadcast several dozen or even hundreds of channels without a plurality of repeaters that are required in analog broadcast systems.

Typically, a digital cable broadcast system includes a head end which transmits digital broadcast signals and processes the data uploaded by subscribers, and a set-top box which converts the digital signals transmitted by the head end to analog signals and accesses the original audio and video signals.

In such a digital broadcast system, cable System Operators (SOs) provide subscribers with cable TV programs, content, and other data that is produced by the SOs or supplied from production companies, such that subscribers access programs and other data of the SOs selectively.

In most digital broadcast systems, the MPEG-2 standard is adopted as the video and audio compression scheme along with the Quadrature Amplitude Modulation (QAM) scheme for highly efficient data transmission using limited transmission bandwidth.

The set-top box is a device that decodes the digitalized broadcast and management information transmitted by the head-end of the local cable TV company in order to receive cable TV or cable modem service, and transfers the decoded analog signals to the TV. The set-top box receives the broadcast and management information from the head-end. The head-end may include a digital broadcast server (Audio/Video Server), a Service Information Server for providing broadcast channel information, and a Conditional Access Server.

The set-top box can receive a firmware update periodically from the head-end to upgrade its firmware.

FIG. 1 is a flowchart illustrating a firmware update procedure in a conventional set-top box.

Referring to FIG. 1, the set-top box boots up in step 101 and receives a public Code Version Table (CVT), which is the CVT carrying information regarding the firmware for all set-top boxes, in step 103. It is assumed that the public CVT contains information instructing the firmware update of the set-top box to the firmware 1. Upon receipt of the public CVT, the set-top box updates its firmware to firmware 1 indicated by the public CVT in step 105 and reboots to load the updated firmware in step 107. It is assumed that, after rebooting, the set-top box receives a filtering CVT, which is the CVT carrying information on firmware targeted to a specific set-top box, which contains information instructing firmware update of the set-top box to firmware 2 in step 109. If the filtering CVT is received in step 109, the set-top box updates its firmware to firmware 2 indicated by the filtering CVT in step 111 and returns to step 101 so as to reboot in order to apply the updated firmware.

After the reboot, the set-top box repeats steps 103 to 111. As a consequence, the set-top box enters an infinite loop of updating the firmware and rebooting.

In the case in which only the public CVT is received, the set-top box can update its firmware with the public CVT without a problem because the filtering CVT is ignored.

However, when both the public CVT and the set-top box-specific filtering CVT are received, the firmware update is performed twice in sequential order.

For example, if the public CVT indicating that firmware AAA is received, the set-top box updates its firmware with firmware AAA. The updated firmware AAA is not updated repeatedly with the firmware AAA of the same public CVT. However, if the filtering CVT indicating a firmware BBB is received, the set-top box updates its firmware to firmware BBB. In this case, the set-top box can receive the public CVT so as to update its firmware to the firmware AAA again.

In this manner, if both the public CVT and the filtering CVT are received, the conventional set-top box updates its firmware with the public and filtering CVTs alternately so as to repeat rebooting to update is the firmware, resulting in an infinite loop.

SUMMARY OF THE INVENTION

In order to solve the problems in the prior art, the present invention provides a firmware update method and apparatus of a set-top box for a digital broadcast system that is capable of updating the firmware with both the public and filtering CVTs without entering into an infinite loop.

In accordance with an aspect of the present invention, a method for updating firmware of a set-top box in a digital broadcast system includes determining whether a newly received CVT following a public CVT which has been previously received and stored is the public CVT or a filtering CVT; and updating, when the newly received CVT is the filtering CVT, the firmware of the set-top box with a filtering firmware indicated by the filtering CVT.

Preferably, updating the firmware includes updating, when a firmware file indicated by the newly received CVT differs from a previously installed firmware of the set-top box, the firmware with the filtering firmware indicated by the newly received firmware.

Preferably, the method further includes determining, when the newly received CVT is the public CVT, whether the newly received CVT is identical to the previously stored CVT, and updating, when the newly received CVT is identical to the previously stored CVT, the firmware with a public firmware indicated by the newly received CVT or temporarily stored CVT.

Preferably, updating the firmware with a public firmware includes updating, when the newly received CVT differs from the previously installed firmware of the set-top box, the firmware of the set-top box with the public firmware indicated by the newly received CVT.

In accordance with another aspect of the present invention, an apparatus for updating firmware of a set-top box in a digital broadcast system includes a CVT receiver which receives a CVT; a CVT processor which determines whether a newly received CVT following a public CVT previously received and stored is the public CVT or a filtering CVT and outputs, when the newly received CVT is the filtering CVT, the newly received filtering CVT; a firmware receiver which receives a firmware file indicated by the CVT output by the CVT processor; and a firmware updater which updates the firmware of the firmware with the received firmware file.

Preferably, the CVT processor outputs, when the newly received CVT is the public CVT and is identical to the temporarily stored CVT, the newly received CVT.

Preferably, the CVT processor initializes, after outputting the newly received CVT, the set-top box by deleting the temporarily stored CVT.

Preferably, the CVT processor outputs, when the newly received CVT is not identical to the previously installed firmware of the set-top box, the newly received CVT.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE EMBODIMENTS OF THE PRESENT INVENTION

The embodiments of the present invention are described in detail with reference to the accompanying drawings. The same reference numbers are used throughout the drawings to refer to the same or like parts. A detailed description of well-known functions and structures incorporated herein may be omitted to avoid obscuring the subject matter of the present invention.

A description is made of the digital broadcast system to which the firmware upgrade method of the present invention is applied.

Figure 2:
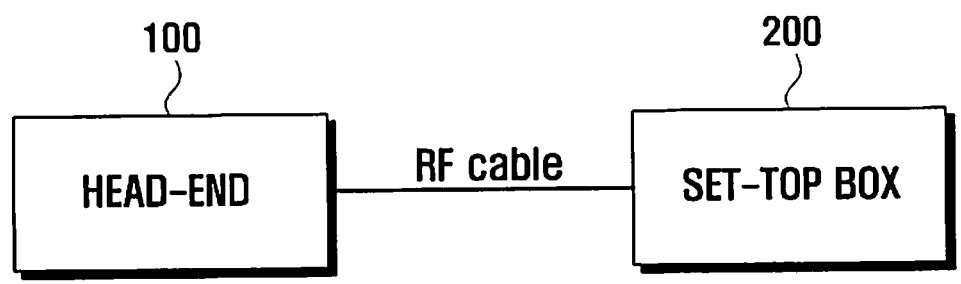
FIG. 2 is a schematic diagram illustrating a digital broadcast system to which the firmware upgrade method according to an embodiment of the present invention is applied.

FIG. 2 is a schematic diagram illustrating a digital broadcast system to which the firmware upgrade method according to an embodiment of the present invention is applied.

As shown in FIG. 2, the digital broadcast system, according to an embodiment of the present invention, includes a head-end 100 and a set-top box 200.

The head-end 100 is the main control center having a technical facility for receiving programs through a satellite and/or a system network and producing and relaying the programs in the cable television system.

The set-top box 200 is the home communication terminal for the multimedia communication service such as Video on Demand (VOD). That is, the set-top box 200 is a device for decoding the digital broadcast and management information transmitted by head-end 100 installed at the local cable TV company for providing subscribers with cable TV and cable modem services and transmitting the decoded analog signals to the subscriber's TV.

The head-end 100 and the set-top box 200 are connected through a Radio Frequency (RF) cable network.

The head-end 100 can transmit broadcast data and other types of data associated with the digital broadcast data (i.e., content). In particular, the head-end 100 can generate and transmit the packets in Data Over Cable Service Interface Specifications (DOCSIS) format (hereinafter, a DSG packet). The DSG packets are transmitted through a signal path (time, frequency, or code) separated from paths for transmitting the broadcast data (contents). The DSG packet carries supplementary information related to the digital broadcast. In particular, the DSG packet can be used to transmit a CVT.

The CVT contains firmware update information for updating the firmware of the set-top box 200 and other information required for the firmware download such as manufacture-specific hardware information and software version information.

The CVT is transferred through a specific DSG Tunnel Message Authentication Code (MAC) in the RF cable network. The DSG Tunnel MAC is the path for transmitting various data required for the set-top box in DSG mode, i.e., a DSG packet, and the DSG packet includes System Information (SI), Entitlement Management Message (EMM), and CVT.

The set-top box 200 receives broadcast data, converts the received broadcast data into broadcast signals appropriate for digital broadcast, and supplies the converted broadcast signals to a digital TV (not shown).

The set-top box 200 also can receive the DOCSIS-formatted packet (DSG packet) through the DSG Tunnel MAC. The set-top box 200 extracts the required data from the received DSG packet and provides the digital broadcast subscriber with various supplementary services with the extracted data.

According to an embodiment of the present invention, the set-top box 200 extracts CVT from the DSG packets and updates its firmware with the firmware information indicated in the CVT. In an embodiment of the present invention, the set-top box 200 follows the DSG standard unless otherwise specified.

Figure 3:
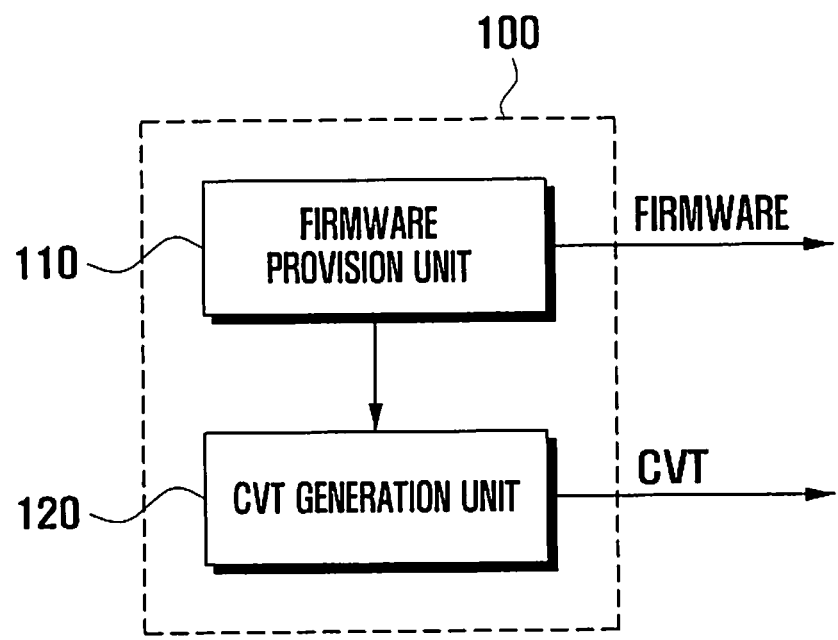
FIG. 3 is a block diagram illustrating a configuration of the head-end of the digital broadcast system according to an embodiment of the present invention.

FIG. 3 is a block diagram illustrating a configuration of the head-end of the digital broadcast system according to an embodiment of the present invention.

As shown in FIG. 3, the head-end 100 includes a firmware provision unit 110 and a CVT generation unit 120.

The firmware provision unit 110 provides the set-top box 200 with various types of firmware.

In particular, the firmware provision unit 110 can transmit the public firmware that is commonly used in all set-top boxes and set-top box-specific firmware dedicated to a specific set-top box.

For example, the digital broadcast system can provide the subscribers with different services depending on the subscribed service level and use different types of firmware for providing various services. That is, there can be different types of firmware for normal service and premium service. The firmware provision unit 110 can transmit the normal service firmware and the premium service firmware in a sequential order.

Also, normal firmware and premium firmware can be configured to provide different functions and service per set-top box or even subscriber.

The CVT generation unit 120 generates and transmits the CVT containing the information on all the types of firmware provided by the firmware provision unit 110. The CVT includes information on the identity, version, and transmission path of the firmware depending on the manufacturer of the set-top box and service level.

In particular, the CVT generation unit 120 generates the public CVT and filtering CVT and transmits the CVTs to the set-top box 200. The public CVT is the CVT carrying the information on the firmware for all the set-top boxes, and the filtering CVT is the CVT carrying the information on the firmware targeted to a specific set-top box.

As mentioned above, the digital broadcast system can provide different services depending on the subscribed service level and use different types of firmware for providing various services. That is, there can be a normal service firmware and a premium service firmware.

The firmware provision unit 110 can transmit the public CVT specifying the information on the normal service firmware and the filtering CVT specifying the information on the premium service.

The classification of the CVTs is not limited to the public and filtering CVTs. The filtering CVT is the CVT carrying the information targeted to a specific set-top box or a specific subscriber and can be used for distinguishing from the public CVT carrying the normal firmware information.

Figure 4:
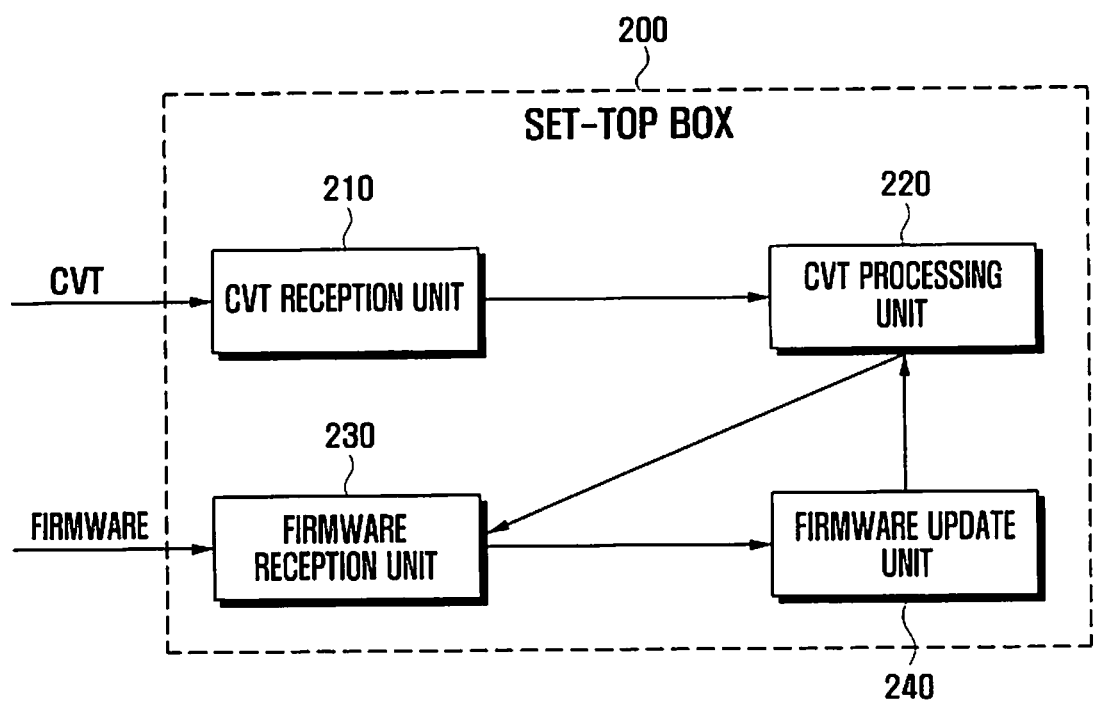
FIG. 4 is a block diagram illustrating a configuration of the set-top box of a digital broadcast system according to an embodiment of the present invention.

FIG. 4 is a block diagram illustrating a configuration of the set-top box of a digital broadcast system according to an embodiment of the present invention.

As shown in FIG. 2, the set-top box 200, according to an embodiment of the present invention, includes a CVT reception unit 210, a CVT processing unit 220, a firmware reception unit 230, and a firmware update unit 240.

Figure 1:
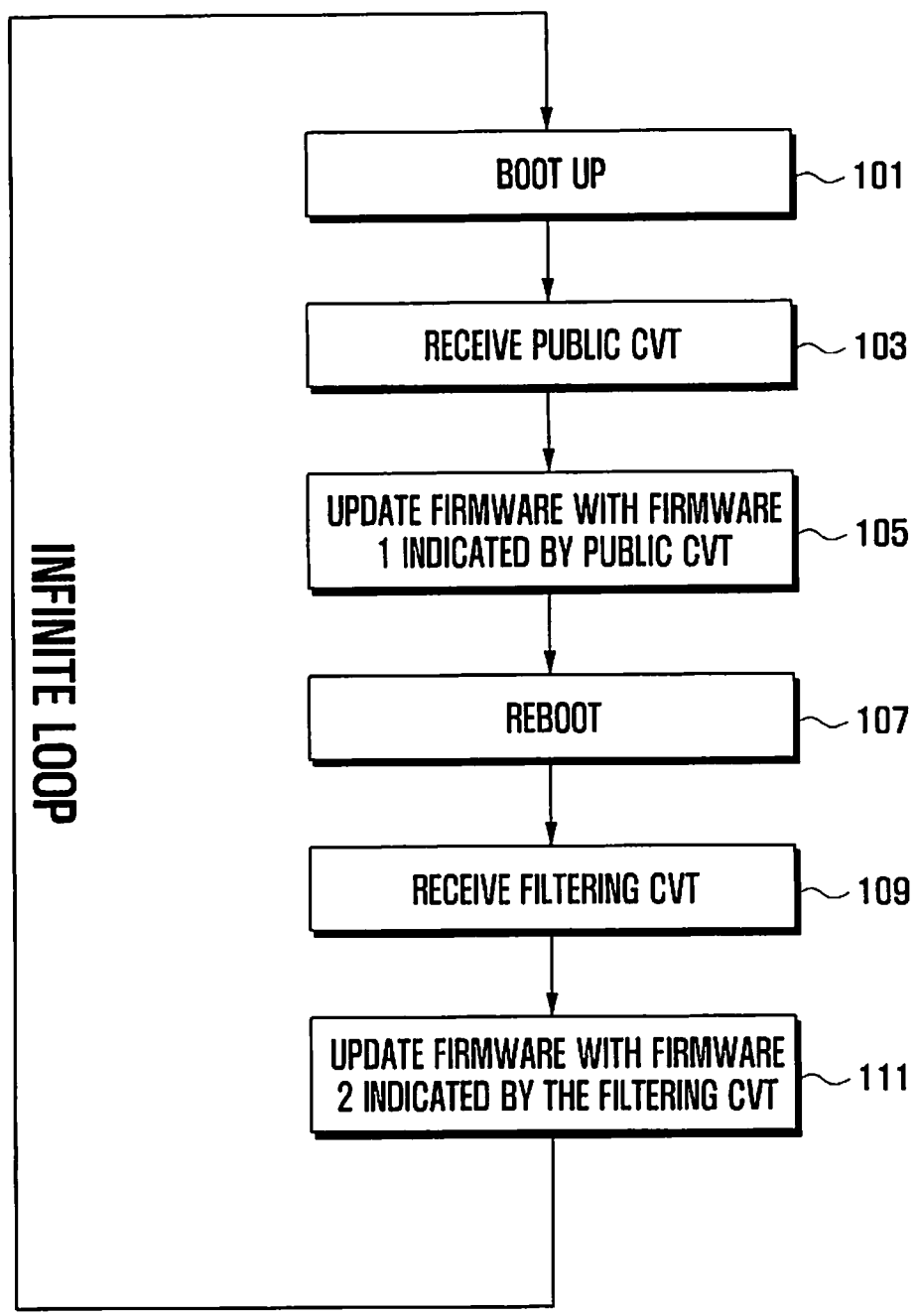
FIG. 1 is a flowchart illustrating a firmware update procedure in a conventional set-top box.

The CVT receiver 210 receives data from the head-end 100 of FIG. 1 through the RF cable network and processes the received data into digital data, i.e., packets. In particular, the CVT reception unit 210 receives the CVT from a known tunnel MAC in Basic DSG mode.

The CVT reception unit 210 can open up to eight DSG tunnel MACs in basic DSG mode. The individual DSG tunnel MACs can be distinguished using their MAC address and transmit the preset data. That is, the CVT is transmitted through one of the DSG tunnel MACs. The CVT reception unit 210 acquires the address of the tunnel MAC transmitting the CVT and receives the CVT through the tunnel MAC.

In this manner, the CVT reception unit 201 can receive the CVT through the CVT-transmitted tunnel MAC. If the CVT is received, the CVT reception unit 210 transfers the received CVT to the CVT processing unit 220. At this time, the CVT receiver 210 transfers the CVT to the CVT processing unit 220 in such a manner of forwarding the tunnel MAC including the CVT.

If the CVT is received, the CVT processing unit 220 selects the CVT to be updated and provides the firmware reception unit 230 with the reception path of the CVT selected for receiving the firmware or the firmware indicated by the selected CVT. The CVT processing unit 220 receives the CVT by means of the CVT reception unit 210. The CVT processing unit 220 temporarily stores the firstly received CVT. It is assumed that the firstly received CVT is a public CVT.

Under this assumption, the CVT processing unit 220 updates the firmware of the set-top box 200 according to the type of a secondly received CVT.

In the case that the secondly received CVT is a filtering CVT, the CVT processing unit 220 determines that the head-end 100 is transmitting a public CVT and the filtering CVT, alternately. The CVT processing unit 220 informs the firmware reception unit 230 of the reception path of the filtering CVT or the firmware indicated by the filtering CVT such that the firmware of the set-top box 200 is updated with the filtering CVT having higher priority.

In the case that the secondly received CVT is a public CVT, the CVT processing unit 220 determines that the head-end 100 transmits only the public CVT continuously. Accordingly, the CVT processing unit 220 informs the firmware reception unit 230 of the reception path of the public CVT or the firmware indicated by the public CVT such that the firmware of the set-top box 200 is updated with the firmware indicated by the public CVT.

Thus, the CVT processing unit 220 receives two different CVTs and updates its firmware with the CVTs selectively, according to the type of the secondly received CVT. This is, when the secondly received CVT is the filtering CVT, to perform the firmware update with the filtering CVT having the higher priority. In the case that the secondly received CVT is the public CVT, the CVT processing unit 220 checks and performs firmware update with the public CVT in consideration of the receipt of the filtering CVT.

The firmware reception unit 230 receives the firmware according to the CVT provided by the CVT processing unit 220. That is, if the CVT is received from the CVT processing unit 220, the firmware reception unit 230 attempts to receive the firmware indicated by the CVT. The firmware reception unit 230 obtains the information using the firmware reception path from the CVT provided by the CVT processing unit 220 and receives the firmware through the firmware reception path.

The CVT processing unit 220 can provide the firmware reception unit 230 with the reception path of the firmware indicated by the CVT. In this case, the firmware reception unit 230 can receive the firmware through the path provided by the CVT processing unit 220. The firmware reception unit 230 provides the received firmware to the firmware update unit 240.

The firmware update unit 240 updates the firmware of the set-top box with the firmware file received by the firmware reception unit 230. Here, the received firmware may be an image file (e.g., a file having an "iso" extension). The firmware update unit 240 installs the received firmware file to the set-top box to update the firmware.

Figure 5:
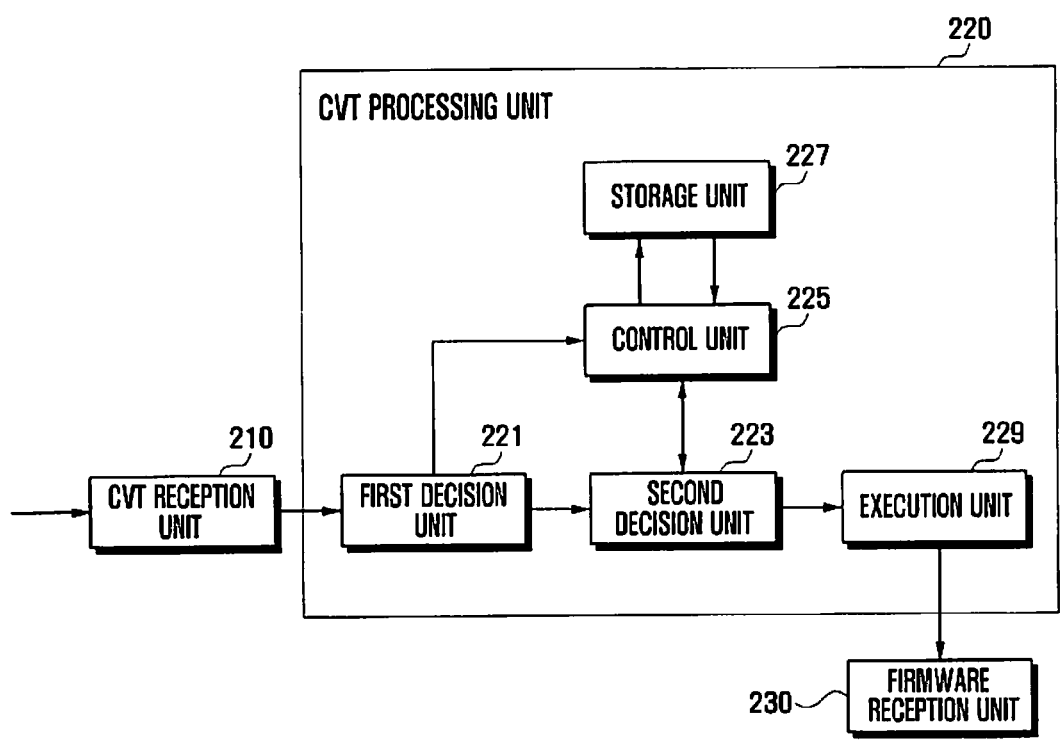
FIG. 5 is a block diagram illustrating a configuration of the CVT processing unit of FIG. 4.

FIG. 5 is a block diagram illustrating a configuration of the CVT processing unit of FIG. 4.

Referring to FIG. 5, the CVT processing unit 220 of the set-top box 200, according to an embodiment of the present invention, includes a first decision unit 221, a second decision unit 223, a control unit 225, a storage unit 227, and an execution unit 229.

The first decision unit 221 determines whether the CVT received by the CVT reception unit 210 is a firstly received public CVT or a secondly received CVT.

In the case of the firstly received public CVT, i.e., if there is no public CVT stored temporarily in the storage unit 227, the first decision unit 221 stores the firstly received CVT in the storage unit 227 under the control of the control unit 225.

In the case of the secondly received CVT, i.e., if the CVT received by the CVT reception unit 210 is a secondly received CVT, the first decision unit 221 forwards the received CVT to the second decision unit 223. At this time, the CVT forwarded to the second decision unit 223 can be either a public CVT or a filtering CVT.

Control unit 225 can store the firstly received CVT in the storage unit 227 temporarily, based on a request from the first decision unit 221. Control unit 225 also can forward the public CVT stored in the storage unit 227 to the second decision unit 225.

Control unit 225 can delete the public CVT stored in the storage unit 227 based on a request from the second decision unit 223 and/or the execution unit 229.

In the case that the firstly received public CVT is stored in the storage unit 227, the second decision unit 223 provides the execution unit 229 with one of the public CVT or the filtering CVT depending on the type of the secondly received CVT.

In the case that the secondly received CVT is the filtering CVT, the second decision unit 223 determines that the head-end 100 transmits the public CVT and the filtering CVT alternately. In this case, the second decision unit 223 provides the execution unit 229 with the filtering CVT to update the firmware of the set-top box with the firmware file indicated by the filtering CVT having higher priority. In the case that the secondly received CVT is the public CVT, the second decision unit 223 determines that the head-end 100 is transmitting only the public CVT repeatedly. In this case, the second decision unit 223 provides the execution unit 229 with the public CVT to update the firmware of the set-top box 200 with the firmware file indicated by the public CVT.

The second decision unit 223 receives the firstly received public CVT from the control unit 225 and the secondly received public or filtering CVT from the first decision unit 221.

In the case that there is a temporarily stored CVT in the storage unit 227 and the CVT received from the first decision unit 221 is the public CVT, the second decision unit 223 determines whether the temporarily stored CVT is identical to the CVT received from the first decision unit 221. If the two CVTs are identical to each other, the second decision unit 223 provides the execution unit 229 with the CVT received from the first decision unit 221.

In the case that there is a temporarily stored CVT in the storage unit 227 and the CVT received from the first decision unit 221 is the filtering CVT, the second decision unit 223 provides the execution unit 229 with the filtering CVT.

Next, the second decision unit 223 deletes the CVT stored in the storage unit 227 to initialize the temporarily stored CVT.

The execution unit 229 receives one of the filtering CVT and public CVT from the second decision unit 223 and compares the firmware indicated by the received CVT with the firmware installed to the set-top box 220 previously to determine whether the received CVT is the most recent version.

If the firmware indicated by the received CVT is the most recent version, the execution unit 229 informs the firmware reception unit 230 of the reception path of the firmware indicated by the received CVT or provides the received CVT itself.

If the firmware indicated by the received CVT is not the most recent version, the execution unit 229 discards or ignores the received CVT. Next, the execution unit 229 deletes the CVT stored temporarily in the storage unit 227, resulting in initialization.

Once the firmware update unit 240 has completed the firmware update, the execution unit 229 reboots the system to apply the updated firmware. That is, after the completion of the firmware update process, the firmware update unit 240 reboots the set-top box 200.

Figure 6A:
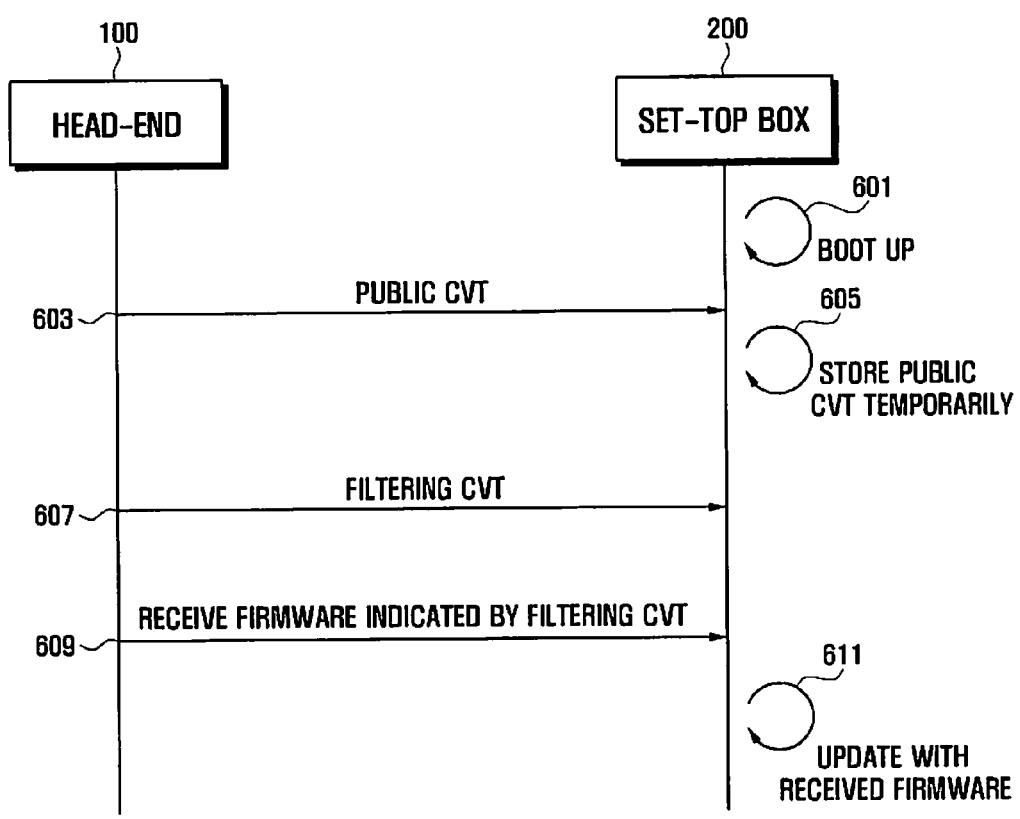
FIGS. 6a and 6b are signaling diagrams illustrating operations of the head-end and the set-top box for the firmware update method in the digital broadcast system according to an embodiment of the present invention.
Figure 6B:
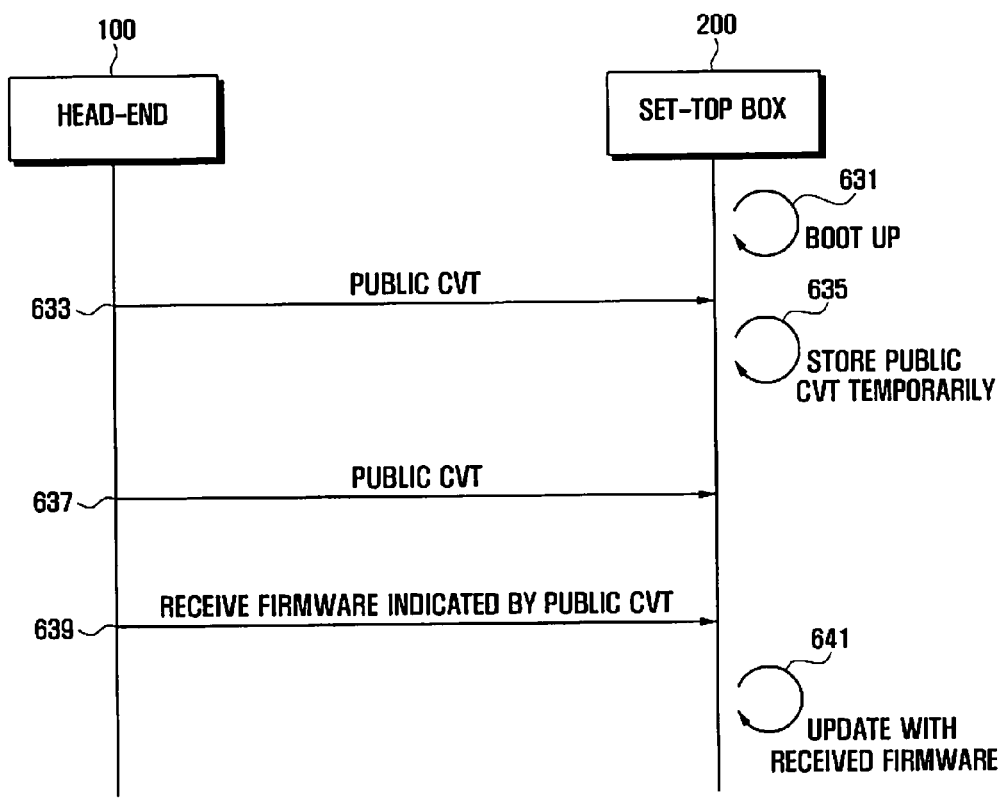

FIGS. 6a and 6b are signaling diagrams illustrating operations of the head-end and the set-top box for the firmware update method in the digital broadcast system according to an embodiment of the present invention.

Referring to FIG. 6a, the set-up box 200 boots up in step 601 and then receives a public CVT transmitted by the head-end 100 in step 603. If the public CVT is received, the set-top box 200 stores the public CVT temporarily in step 605.

In FIG. 6a, it is assumed that the head-end 100 transmits the public and filtering CVTs in an alternating cycle.

After booting up in step 601, the set-top box 200 receives the public CVT transmitted by the head-end 100 in step 603. Upon receipt of the public CVT, the set-top box 200 stores the public CVT temporarily in step 605. Next, the set-top box 200 receives the filtering CVT in step 607.

Once the filtering CVT has been received, the set-top box 200 determines that the head-end 100 transmits the public CVT and the filtering CVT alternately.

Accordingly, the set-top box 200 receives the firmware file indicated by the received filtering CVT in step 609 and updates the firmware of the set-top box 200 with the received firmware file in step 611.

After updating the firmware, the set-top box 200 returns the procedure to step 601 and reboots to apply the updated filtering CVT. In the case of FIG. 6a, the firmware update with the public CVT does not occur even though steps 601 to 611 repeat continuously. That is, in the case that both the public and filtering CVTs are transmitted, the set-top box 200 does not perform the firmware update with the firstly received public CVT immediately but with the filtering CVT received later so as to save system resources.

FIG. 6b shows a case in which the head-end transmits only the public CVT.

Referring to FIG. 6b, the set-top box 200 boots up in step 631 and receives a public CVT transmitted by the head-end 100 in step 633. If the public CVT is received, the set-top box 200 stores the public CVT temporarily in step 635. Next, set-top box 200 receives the public CVT transmitted by the head-end 100 again in step 637.

If the public CVT is received, the set-top box 200 determines that the head-end transmits only the public CVT continuously.

In this case, the set-top box 200 receives the firmware file indicated by the public CVT in step 639.

Finally, the set-top box 200 updates its firmware with the received firmware file and reboots the system to apply the updated firmware in step 641.

In the case of FIG. 6b, if the secondly received CVT is the public CVT, the set-top box could update the firmware with the public CVT at that time and then continue the update process, possibly receiving the filtering CVT as in the case of FIG. 6a.

Figure 7:
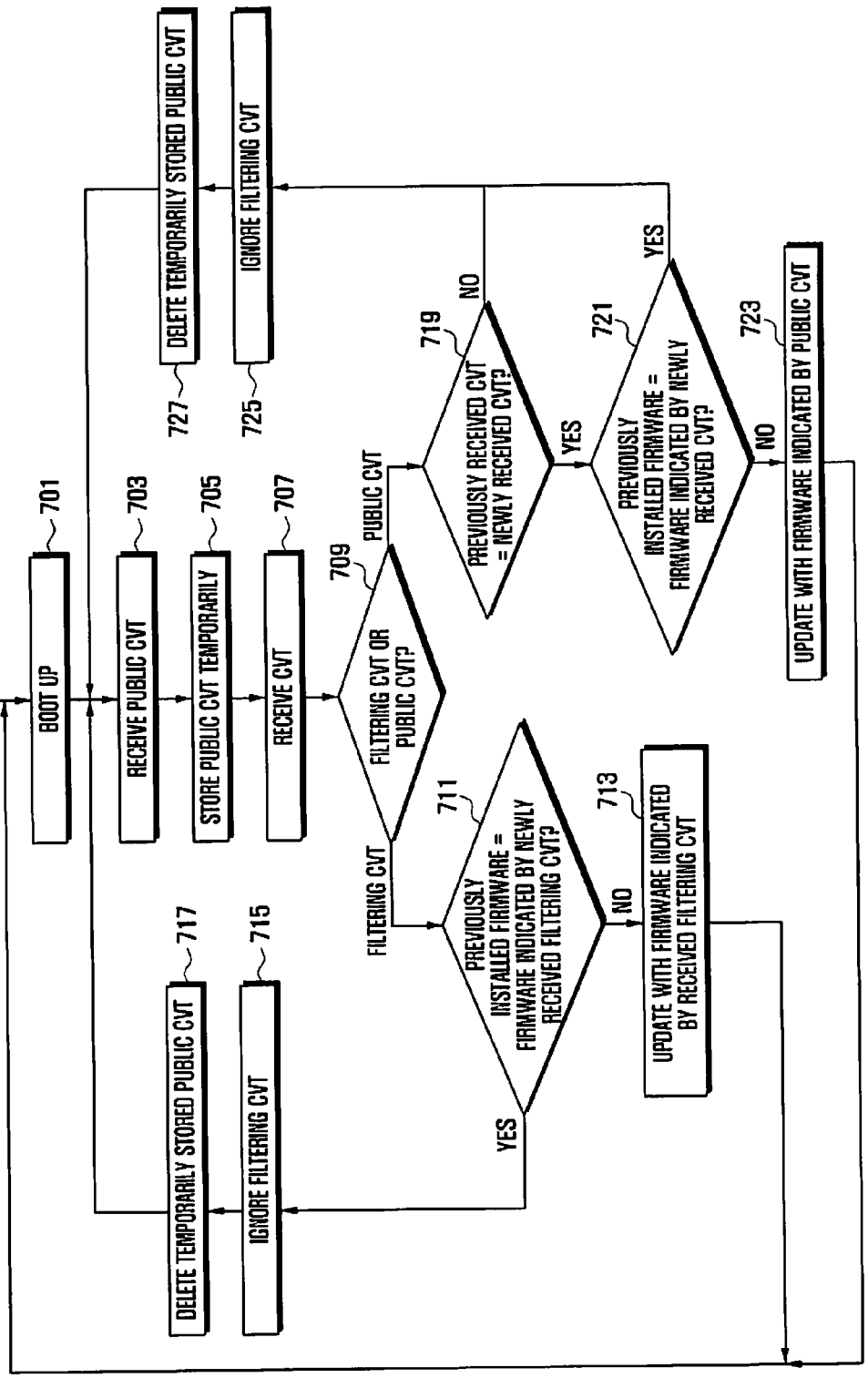
FIG. 7 is a flowchart illustrating a firmware update method for a set-top box of a digital broadcast system according to an embodiment of the present invention.

FIG. 7 a flowchart illustrating a firmware update method for a set-top box of a digital broadcast system, according to an embodiment of the present invention.

In the case of FIG. 7, it is assumed that the head-end 100 transmits the public and filtering CVTs alternatingly, in a cyclic manner. When there is no filtering CVT to be transmitted, the head-end 100 transmits the public CVT repeatedly.

The CVT update procedure repeats continuously as long as the set-box box 200 is turned on.

In the case that head end 100 transmits both the public and filtering CVTs, as in FIG. 7, the public and filtering CVTs are transmitted alternately in a cycle and, if no filtering CVT exists, the public CVT is transmitted repeatedly.

Assuming that the set-top box 200 receives the CVT twice and the firstly received CVT is the public CVT, the set-top box 200 determines the type of the CVT to use to update its firmware according to the type of the second CVT and performs a firmware update with the determined CVT.

Set-top box 200 boots up in step 701 and then receives a CVT first in step 703. The set-top box 200 receives the CVT again in step 707.

It is assumed that the CVT received in step 703 is the public CVT. The firstly received CVT is stored in the storage unit in step 705.

Next, the set-top box receives another CVT in step 707 and determines whether the newly received CVT is the filtering CVT or the public CVT in step 709.

If the newly received CVT is the filtering CVT, head-end 100 transmits the public CVT and the filtering CVT alternately, such that the procedure goes to step 711. Otherwise, if the newly received CVT is the public CVT, head-end 100 transmits the public CVT repeatedly, such that the procedure goes to step 719.

In step 711, the set-top box 200 determines whether the previously installed firmware is identical to that indicated by the received filtering CVT.

If the previously received firmware of the set-top box 200 is not identical to that indicated by the received filtering CVT, the set-top box 200 receives the firmware file indicated by the filtering CVT and updates its firmware with the newly received firmware file in step 713. Next, the set-top box 200 returns to step 701 to reboot the system with the updated firmware.

Otherwise, if the previously installed firmware of the set-top box 200 is identical to that indicated by the received filtering CVT, the set-top box 200 ignores the filtering CVT in step 715 and deletes the old public CVT stored in step 705 in step 717, and goes to step 703.

In step 719, the set-top box 200 determines whether the newly received CVT is identical to the previously received CVT.

If the newly received CVT is identical to the previously received CVT, the procedure goes to step 721. Otherwise, if the newly received CVT is not identical to the previously received CVT, the procedure goes to step 725.

In step 721, the set-top box 200 determines whether the firmware file indicated by the newly received CVT is identical to the firmware file indicated by the previously received CVT. At this time, the firmware file indicated by the newly received CVT also can be compared with the previously-installed firmware of the set-top box.

If the firmware file indicated by the newly received CVT is not identical to the firmware file indicated by the previously received CVT, the set-top box 200 receives the firmware file indicated by the newly received CVT and updates the firmware of the set-top box 200 with the received firmware file in step 723. Next, the set-top box 200 returns to step 701 to reboot the system with the updated firmware and filtering CVT.

Otherwise, if the firmware file indicated by the newly received CVT is identical to the firmware file indicated by the previously received CVT, the set-top box 200 ignores the public CVT in step 725, deletes the public CVT stored in step 705, and returns to step 703.

As described above, when both the public and filtering CVTs are used, the set-top box 200 stores the first CVT temporarily and compares, if a new CVT is received, the new CVT with the previously stored old CVT to determine the CVT with which it performs the firmware update, thereby avoiding an infinite loop in the firmware update process, thereby saving system resources.

Although embodiments of the present invention have been described in detail above, it should be clearly understood that many variations and/or modifications of the basic inventive concepts herein taught which may appear to those skilled in the present art will still fall within the spirit and scope of the present invention, as defined by the appended claims.

For example, although the firmware update procedure is directed to the case where the types of CVTs, i.e., public and filtering CVTs, the present invention is not limited thereto. That is, the firmware update procedure of the present invention can be applied to the digital broadcast system using more than one public CVT and filtering CVT.

What is claimed is:

1. A method executed by a processor for updating firmware of a set-top box in a digital broadcast system, comprising:
    storing a public Code Version Table (CVT) that has been previously received;
    determining whether a newly received CVT following the public CVT is either a public CVT or a filtering CVT;
    if the newly received CVT is the public CVT, determining whether the newly received CVT is identical to the stored CVT, and updating the firmware with a public firmware indicated by the newly received CVT if the newly received CVT is identical to the stored CVT;
    if the newly received CVT is the filtering CVT, updating the firmware of the set-top box with a filtering firmware indicated by the filtering CVT,
    wherein the public CVT is a CVT carrying information on the firmware for all the set-top boxes, and the filtering CVT is a CVT carrying information on the firmware targeted to a specific set-top box.

2. The method of claim 1, wherein updating the firmware of the set-top box with the filtering firmware comprises:
    determining whether the firmware of the set-top box differs from the filtering firmware; and
    updating the firmware of the set-top box with the filtering firmware, if the filtering firmware differs from the firmware of the set-top box.

3. The method of claim 1, wherein updating the firmware with the public firmware comprises:
    determining whether the firmware of the set-top box differs from the public firmware; and
    updating the firmware of the set-top box with the public firmware, if the public firmware differs from the firmware of the set-top box.

4. An apparatus having a memory storing executable instructions for updating firmware of a set-top box in a digital broadcast system, comprising:
    a Code Version Table (CVT) receiver which receives a CVT;
    a CVT processor which stores a public CVT which has been previously received and determines whether a newly received CVT following the public CVT is the public CVT or a filtering CVT, determines, if the newly received CVT is the public CVT, whether the newly received CVT is identical to the previously stored CVT, and outputs the newly received CVT;
    a firmware receiver which receives a firmware file indicated by the CVT output by the CVT processor; and
    a firmware updater which updates the firmware of the firmware with the received firmware file,
    wherein, if the newly received CVT is identical to the previously stored CVT, updating the firmware includes updating the firmware with a public firmware indicated by the newly received CVT, and wherein the public CVT is a CVT carrying information on the firmware for all the set-top boxes, and the filtering CVT is a CVT carrying information on the firmware targeted to a specific set-top box.

5. The apparatus of claim 4, wherein the CVT processor initializes, after outputting the newly received CVT, the set-top box by deleting the temporarily stored CVT.

6. The apparatus of claim 4, wherein the CVT processor outputs, if a firmware file executed by the newly received CVT is not identical to the previously installed firmware of the set-top box, the newly received CVT.

7. A method executed by a processor for updating firmware of a set-top box in a digital broadcast system, comprising:

booting up and storing a public Code Version Table (CVT) that has been previously received;

receiving a newly CVT and determining whether the newly received CVT following the stored public CVT is either a public CVT or a filtering CVT; and updating, if the newly received CVT is the filtering CVT, the firmware of the set-top box with a filtering firmware indicated by the filtering CVT, wherein the public CVT is a CVT carrying information on the firmware for all the set-top boxes, and the filtering CVT is a CVT carrying information on the firmware targeted to at least one specific set-top box.

8. The method of claim 7, wherein updating the firmware of the set-top box with the filtering firmware further comprises:

if the newly received CVT is the public CVT, determining whether the newly received CVT is identical to the stored CVT, and updating the firmware with a public firmware indicated by the newly received CVT if the newly received CVT is identical to the stored CVT; and if the newly received CVT is the filtering CVT, updating the firmware of the set-top box with a filtering firmware indicated by the filtering CVT.

9. The method of claim 8, wherein updating the firmware with the public firmware comprises:

determining whether the firmware of the set-top box differs from the public firmware; and updating the firmware of the set-top box with the public firmware, if the public firmware differs from the firmware of the set-top box.

10. The method of claim 8, wherein updating the firmware of the set top box with the filtering firmware comprises:

ignoring the newly received CVT and deleting the stored public CVT, if the newly received CVT differs from the stored CVT.

11. The method of claim 7, wherein updating the firmware of the set-top box with the filtering firmware comprises:

determining whether the firmware of the set-top box differs from the filtering firmware; and updating the firmware of the set-top box with the filtering firmware, if the filtering firmware differs from the firmware of the set-top box.

12. The method of claim 11, wherein updating the firmware of the set top box with the filtering firmware comprises:

ignoring the filtering CVT and deleting the stored public CVT, if the filtering firmware is identical to the firmware of the set top box.

13. An apparatus having a memory storing executable instructions for updating firmware of a set-top box in a digital broadcast system, comprising:

a Code Version Table (CVT) receiver which receives a CVT;

a CVT processor which controls to boot up and to store a public Code Version Table (CVT) that has been previously received, to receive a newly CVT and determine whether the newly received CVT following the stored public CVT is either a public CVT or a filtering CVT; and to update, if the newly received CVT is the filtering CVT, the firmware of the set-top box with a filtering firmware indicated by the filtering CVT, a firmware receiver which receives a firmware file indicated by the CVT output by the CVT processor; and a firmware updater which updates the firmware of the firmware with the received firmware file, wherein the public CVT is a CVT carrying information on the firmware for all the set-top boxes, and the filtering CVT is a CVT carrying information on the firmware targeted to at least one specific set-top box.

14. The apparatus of claim 13, wherein updating the firmware of the set-top box with the filtering firmware further comprises:

if the newly received CVT is the public CVT, determining whether the newly received CVT is identical to the stored CVT, and updating the firmware with a public firmware indicated by the newly received CVT if the newly received CVT is identical to the stored CVT; and if the newly received CVT is the filtering CVT, updating the firmware of the set-top box with a filtering firmware indicated by the filtering CVT.

15. The apparatus of claim 14, wherein updating the firmware of the set-top box with the filtering firmware comprises:

determining whether the firmware of the set-top box differs from the filtering firmware; and updating the firmware of the set-top box with the filtering firmware, if the filtering firmware differs from the firmware of the set-top box.

16. The apparatus of claim 15, wherein updating the firmware of the set top box with the filtering firmware comprises:

ignoring the filtering CVT and deleting the stored public CVT, if the filtering firmware is identical to the firmware of the set top box.

17. The apparatus of claim 14, wherein updating the firmware of the set top box with the filtering firmware comprises:

ignoring the newly received CVT and deleting the stored public CVT, if the newly received CVT differs from the stored CVT.

18. The apparatus of claim 13, wherein updating the firmware with the public firmware comprises:

determining whether the firmware of the set-top box differs from the public firmware; and updating the firmware of the set-top box with the public firmware, if the public firmware differs from the firmware of the set-top box.

* * * * *